(12) United States Patent
Dinescu et al.

(10) Patent No.: US 11,351,894 B2
(45) Date of Patent: Jun. 7, 2022

(54) INFANT CARRIER WITH INTEGRATED STORAGE

(71) Applicant: Clek Inc., Toronto (CA)

(72) Inventors: Iuliu Vig Dinescu, Aurora (CA); Quinn Hu, North York (CA); Giuseppe Rotiroti, King City (CA)

(73) Assignee: Clek Inc., Toronto (CA)

( * ) Notice: Subject to any disclaimer, the term of this patent is extended or adjusted under 35 U.S.C. 154(b) by 133 days.

(21) Appl. No.: 16/942,581

(22) Filed: Jul. 29, 2020

(65) Prior Publication Data
US 2022/0032825 A1    Feb. 3, 2022

(51) Int. Cl.
*B60N 2/28* (2006.01)
*A47D 13/02* (2006.01)
*A47D 15/00* (2006.01)

(52) U.S. Cl.
CPC ......... *B60N 2/2803* (2013.01); *A47D 13/025* (2013.01); *A47D 15/00* (2013.01); *B60N 2/2845* (2013.01); *B60N 2/2872* (2013.01)

(58) Field of Classification Search
USPC .................................................... 297/188.12
See application file for complete search history.

(56) References Cited

U.S. PATENT DOCUMENTS

| 4,291,915 | A * | 9/1981 | Cox ..................... B60N 2/2866 297/188.1 |
| 6,773,064 | B2 * | 8/2004 | Treen ..................... A47D 1/103 297/255 |
| 6,848,746 | B2 * | 2/2005 | Gentry ................... A47C 7/748 297/229 |
| 7,798,569 | B2 * | 9/2010 | Comarella ............. A47C 1/121 297/188.1 |
| 7,878,584 | B2 * | 2/2011 | Hu ....................... A47D 15/006 297/153 |
| 8,567,862 | B2 * | 10/2013 | Williams ............. B60N 2/2863 297/256.16 |
| 9,635,955 | B2 * | 5/2017 | Greger ..................... A47D 1/10 |
| 9,974,396 | B2 * | 5/2018 | Sozzo ..................... A47D 15/00 |
| 10,737,593 | B1 * | 8/2020 | Shellenberger ....... B60N 2/2806 |
| 2004/0046429 | A1 * | 3/2004 | Marshall ................ A47C 16/02 297/188.12 |
| 2009/0066130 | A1 * | 3/2009 | Shafer .................. B60N 2/2806 297/256.16 |
| 2010/0187880 | A1 * | 7/2010 | Heisey ................. B60N 2/2806 297/256.16 |
| 2011/0272985 | A1 * | 11/2011 | Fritz ...................... B60N 2/286 297/253 |
| 2013/0082498 | A1 * | 4/2013 | Doolan, III .......... B60N 2/2875 297/256.1 |
| 2015/0091348 | A1 * | 4/2015 | Juchniewicz ........ B60N 2/2845 297/256.16 |

(Continued)

FOREIGN PATENT DOCUMENTS

KR    20150112823 A  *  3/2020

*Primary Examiner* — David E Allred
(74) *Attorney, Agent, or Firm* — Graham Patent Law

(57) ABSTRACT

An infant carrier includes a seat body, a storage unit and a non-rigid restraint assembly. The seat body is shaped to support an infant. The storage unit is integrated into the seat body, and the non-rigid restraint assembly is secured to the storage unit. The storage unit is configured to retain an entirety of the non-rigid restraint assembly therein.

18 Claims, 10 Drawing Sheets

(56) References Cited

U.S. PATENT DOCUMENTS

2016/0114705 A1* 4/2016 Morgenstern ........ B60N 2/2866
                                                      297/250.1
2016/0347210 A1* 12/2016 Mason ................. B60N 2/2806
2020/0260884 A1* 8/2020 Smith ................. A47D 13/025

* cited by examiner

INFANT CARRIER WITH INTEGRATED STORAGE

FIELD

This patent application relates to a child safety seat intended for installation in an automotive vehicle.

BACKGROUND

An infant traveling in a motor vehicle is particularly vulnerable to injury from impact forces when the vehicle stops suddenly. In order to reduce the likelihood of injury to the infant, the infant may be required to be restrained in an approved infant carrier. The conventional approved infant carrier includes a base section, and a seat section that is attached to the base section. The base section may be secured to the vehicle via a rigid restraint. In order to facilitate removal of the infant from the vehicle, an adult may detach the seat section from the base section, leaving the base section secured to the vehicle.

SUMMARY

As described in this patent application, there is provided an infant carrier that includes an storage unit integrated therein. The storage unit may house a non-rigid restraint system that allows the infant carrier to be secured to an automotive vehicle without a separate base section.

In one aspect, the infant carrier includes a seat body, a storage unit and a non-rigid restraint assembly. The seat body is shaped to support an infant. The storage unit is integrated into the seat body, and the non-rigid restraint assembly is secured to the storage unit. The storage unit may be configured to retain an entirety of the non-rigid restraint assembly therein.

In another aspect, the infant carrier includes a seat body, and a storage unit. The seat body is shaped to support an infant. The storage unit is integrated into the seat body.

In one implementation, the seat body includes a seat shell, and a lower surface of the seat shell defines a cavity. The storage unit is pivotable relative to the seat shell between a recessed position in which the storage unit is disposed within the cavity and an exposed position in which the storage unit is remote from the cavity.

In one implementation, the storage unit includes a storage unit bottom, a storage unit side wall extending from the storage unit bottom, and a lid secured to the storage unit side wall. The storage unit bottom, the storage unit side wall and the lid define a storage volume therebetween.

The lid may be rotatable relative to the storage unit side wall between an opened position and a closed position when the storage unit is disposed in the recessed position. The storage volume is externally accessible when the lid is disposed in the opened position, but is not externally accessible when the lid is disposed in the closed position.

In one implementation, the seat body includes a mounting rod that is secured to the seat shell and extends through the cavity. The storage unit bottom may include a mounting channel that captures the mounting rod therein, and the storage unit may be pivotally secured to the seat shell via the mounting rod and the mounting channel.

In one implementation, the non-rigid restraint assembly includes a flexible belt web, a belt tether and a pair of latches. The belt web includes a pair of opposite web ends, and the latches are each disposed at a respective one of the web ends. The belt tether includes a pair of opposite tether ends, is secured to the belt web at one of the tether ends, and is secured to the storage unit at the other tether end.

The storage unit may include an access channel that allows the belt tether to extend from the storage volume through the access channel when the lid is disposed in the closed position.

The storage unit bottom may include an aperture, and the storage unit may include an anchor rod extending between the storage unit side wall and the storage unit bottom. At least one of the latches may extend through the aperture and may be secured to the anchor rod.

The infant seat may be secured to an automotive vehicle by positioning the infant seat on the seat cushion of a permanent seat of the vehicle, removing the non-rigid restraint assembly from the storage unit, looping the non-rigid restraint assembly around the seat body of the infant seat, and connecting the non-rigid restraint assembly to an anchor point of the vehicle. The infant seat may be removed from the vehicle by disconnecting the non-rigid restraint assembly from the vehicle anchor, and returning the non-rigid restraint assembly to the storage unit.

The inventors have discovered that the infant seat satisfies industry crash testing standards for child safety seats, notwithstanding that the infant seat does not require a separate base section for the infant seat be secured to the vehicle.

BRIEF DESCRIPTION OF THE DRAWINGS

The infant carrier will now be described, by way of example, with reference to the accompanying drawings, in which.

DETAILS

Figure 1:
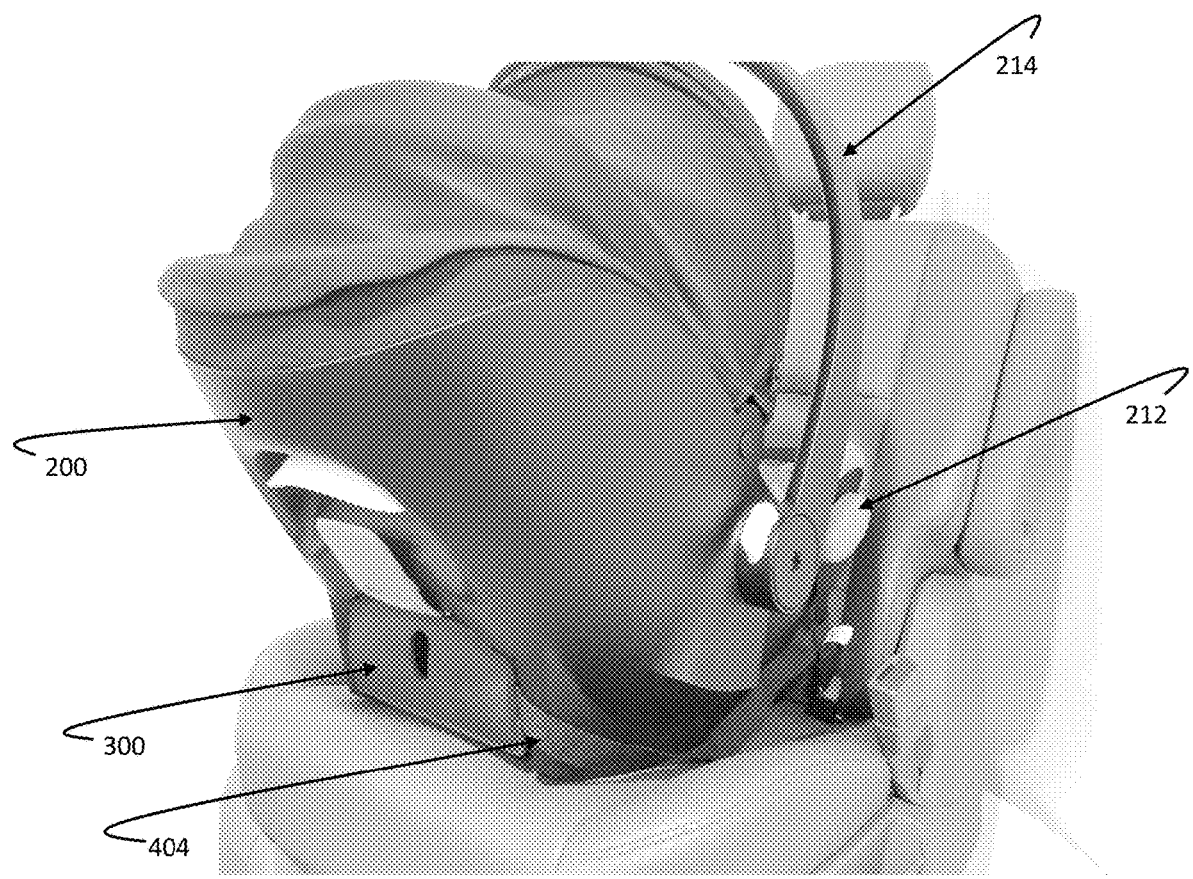
FIG. 1 is a rear perspective view of the infant carrier installed on a vehicle seat cushion, depicting the seat body and the storage unit.
Figure 9:
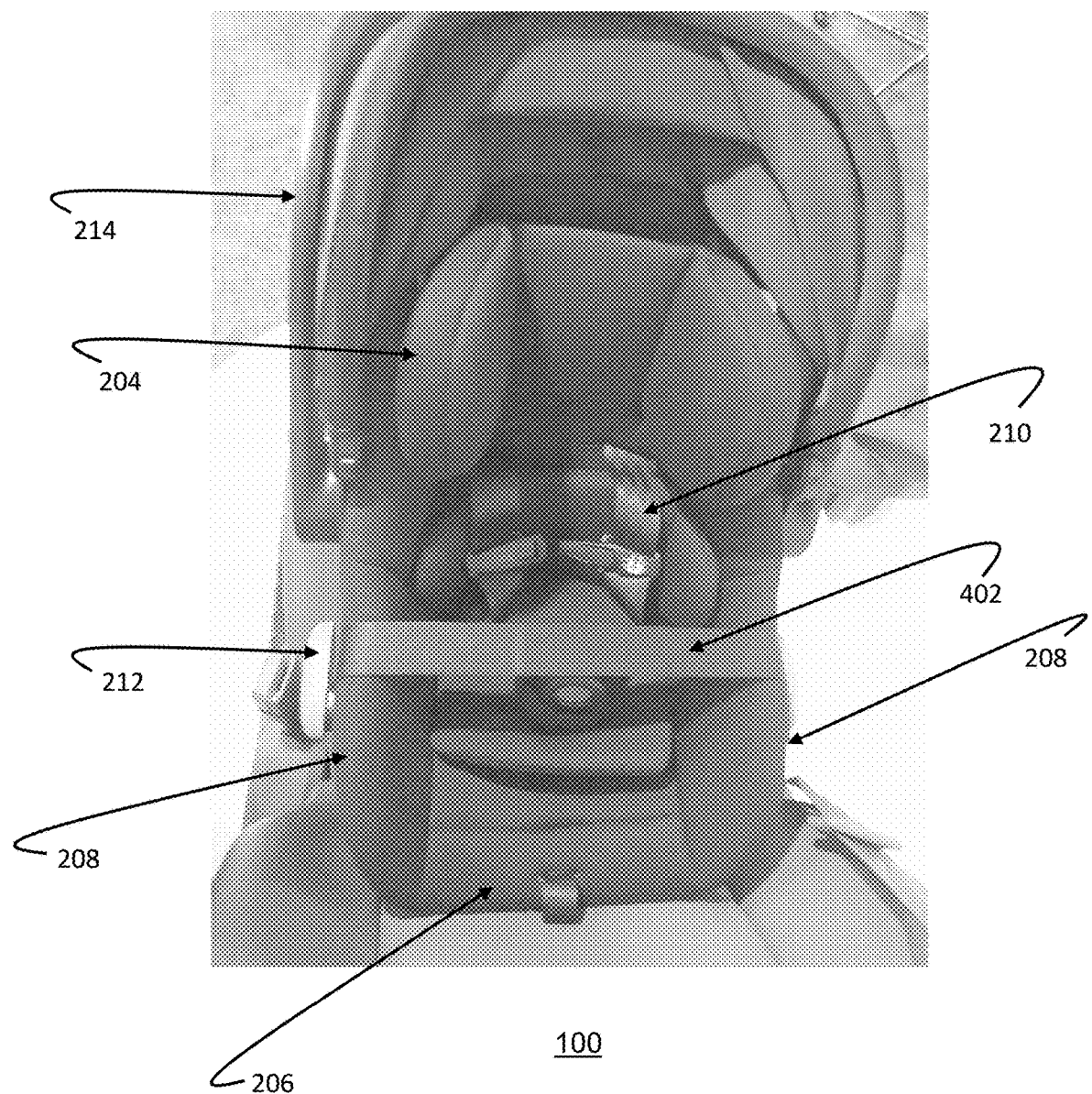
FIG. 9 is a front perspective view of the infant carrier installed on a vehicle seat cushion, depicting the belt web deployed over the seat body and secured to the vehicle anchors.

Turning to FIGS. 1 and 9, there is shown an infant carrier 100 that is configured for installation in a motor vehicle, such as a car or truck. Preferably, the motor vehicle is configured with LATCH (Lower Anchors and Tethers for CHildren) system anchors that are fixed to the vehicle proximate the rear of the vehicle seats.

The infant carrier 100 includes a seat body 200, and a storage unit 300. The seat body 200 is shaped to support an infant, and the storage unit 300 is integrated into and mounted to the seat body 200.

Figure 2:
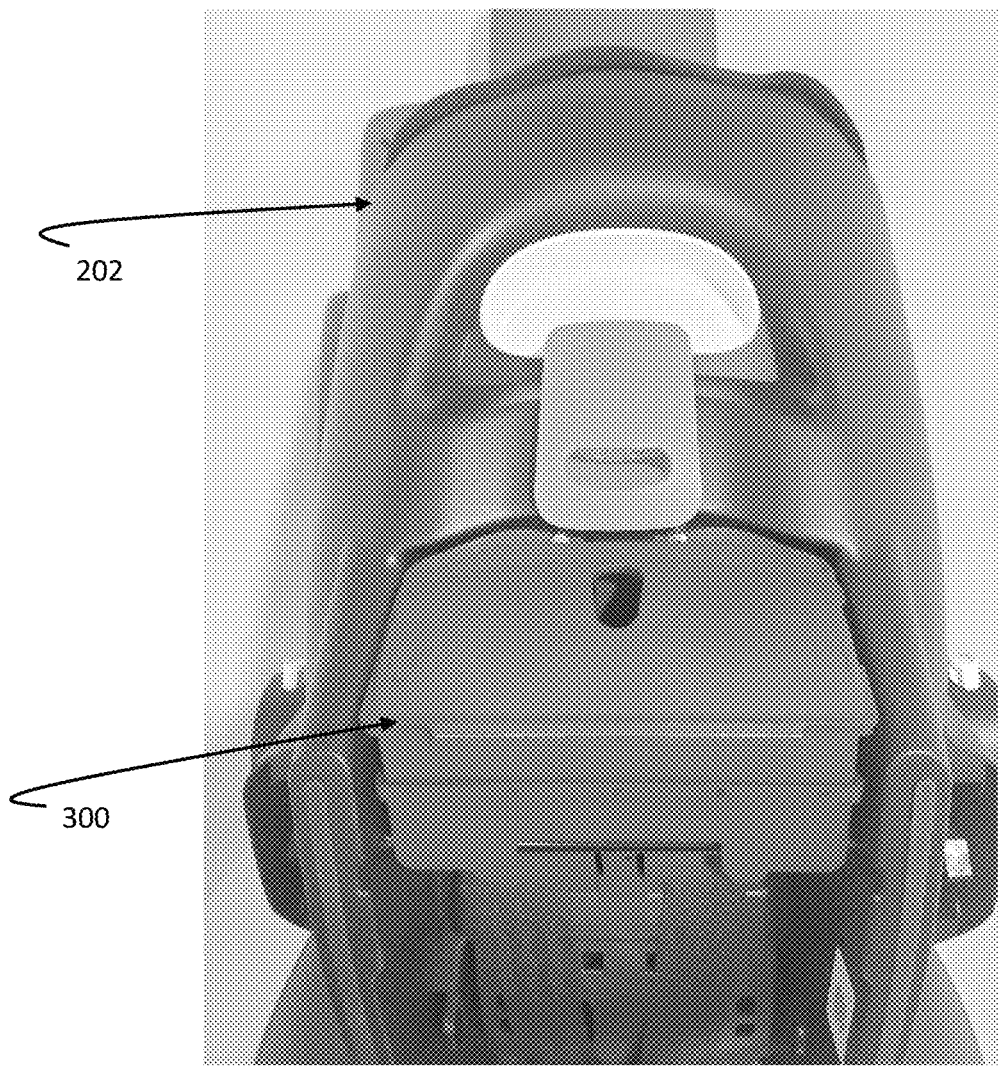
FIG. 2 is a bottom elevation of the infant carrier, depicting the rear/bottom of the seat body and the side wall and lid of the storage unit.

The seat body 200 includes a seat shell 202 (see FIG. 2). The seat shell 202 has a central section and a pair of side wall sections that extend from the central section. As shown in FIG. 9, the seat body 200 may also include a seat cushion that is provided on an upper surface of the seat shell 202, over the central and side wall sections of the seat shell 202, in order to comfortably support and retain the infant in the seat body 200 when the infant is situated in the infant carrier 100.

As shown in FIG. 9, the seat cushion of the seat body 200 may include an upper body cushion 204 and a lower body cushion 206 that is provided over the central section of the seat shell 202. The seat cushion may also include a pair of side cushions 208 that are provided over the side wall sections of the seat shell 202.

When an infant is seated in the infant carrier 100, the infant is oriented such that the upper body of the infant is supported by the seat shell 202 and the upper body cushion 204, and the lower body of the infant is supported by the seat shell 202 and the lower body cushion 206. Further, the side cushions 208 limit lateral movement of the infant relative to the seat body 200. The seat body 200 may also include a set of shoulder belt restraints 210 that retain the infant within the seat body 200, against the seat cushion.

Figure 10:
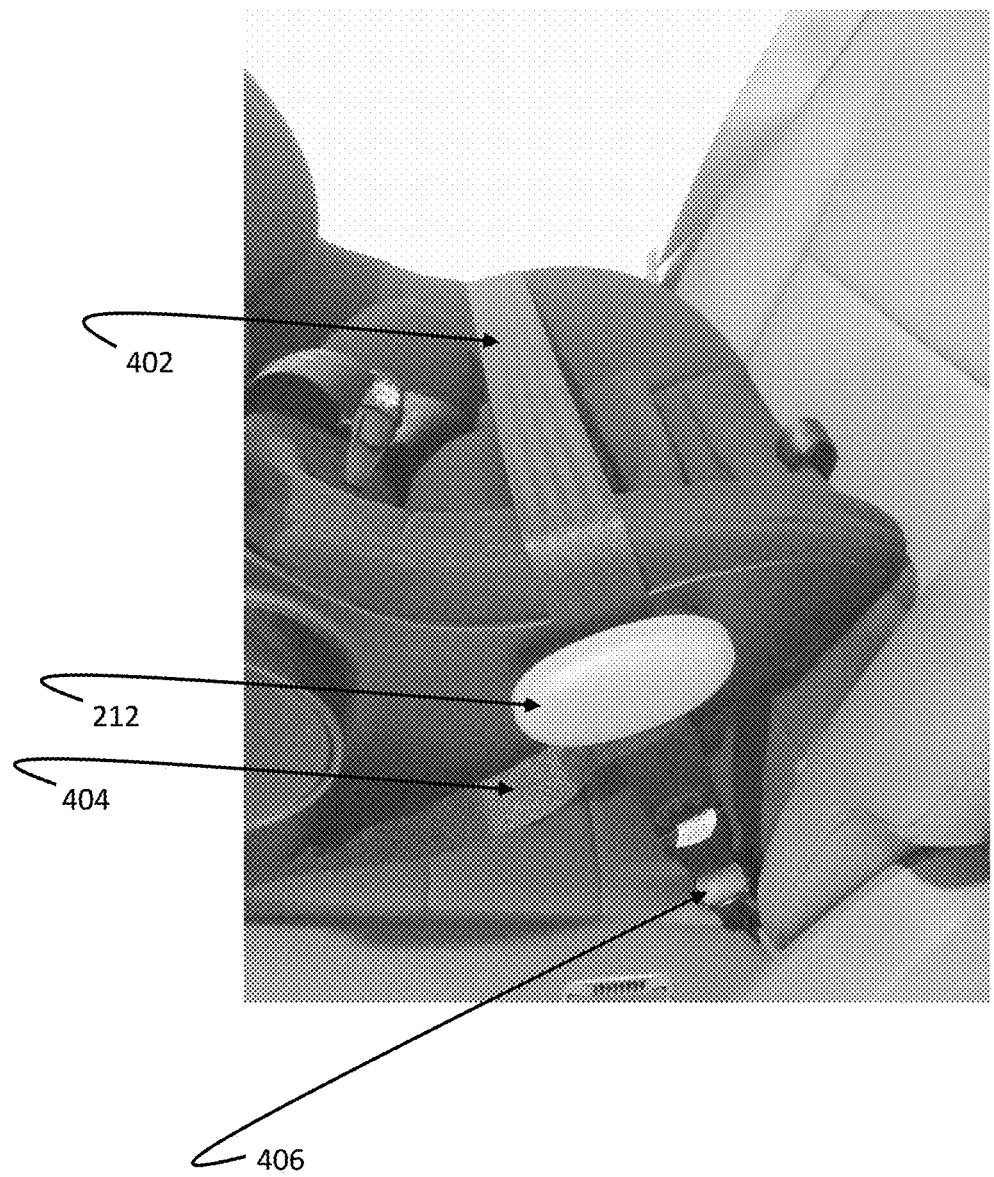
FIG. 10 is a side elevation of the infant carrier shown in FIG. 9.

As shown in FIGS. 9 and 10, the seat body 200 may include a pair of belt guides 212 that are disposed about the sides of the seat body 200, proximate the lower body cushion 206. The belt guides 212 are each mounted to a respective side wall section of the seat shell 202, laterally outwards from the associated side cushion 208 by pins (not shown) that extend between the belt guides 212 and the seat shell 202. As shown, the infant carrier 100 is typically positioned on the seat cushion of the vehicle seat, oriented such that the seat cushion is facing the rear of the vehicle, and is secured to the vehicle seat by looping a flexible belt web 402 around the seat body 200, proximate the lower body cushion 206, between the side cushions 208 and the belt guides 212, and securing the belt web 402 to the LATCH system anchors of the vehicle.

As shown in FIGS. 1 and 9, the seat body 200 may also include a U-shaped transport handle 214 that is pivotally coupled to the side sections of the seat shell 202, at a location approximately intermediate between the upper body cushion 204 and the lower body cushion 206. The transport handle 214 may be used to transport the infant carrier 100 (and the infant) into and out of the vehicle, and may be rotated towards the upper body cushion 204 after the infant carrier 100 is positioned on the vehicle seat.

Figure 8:
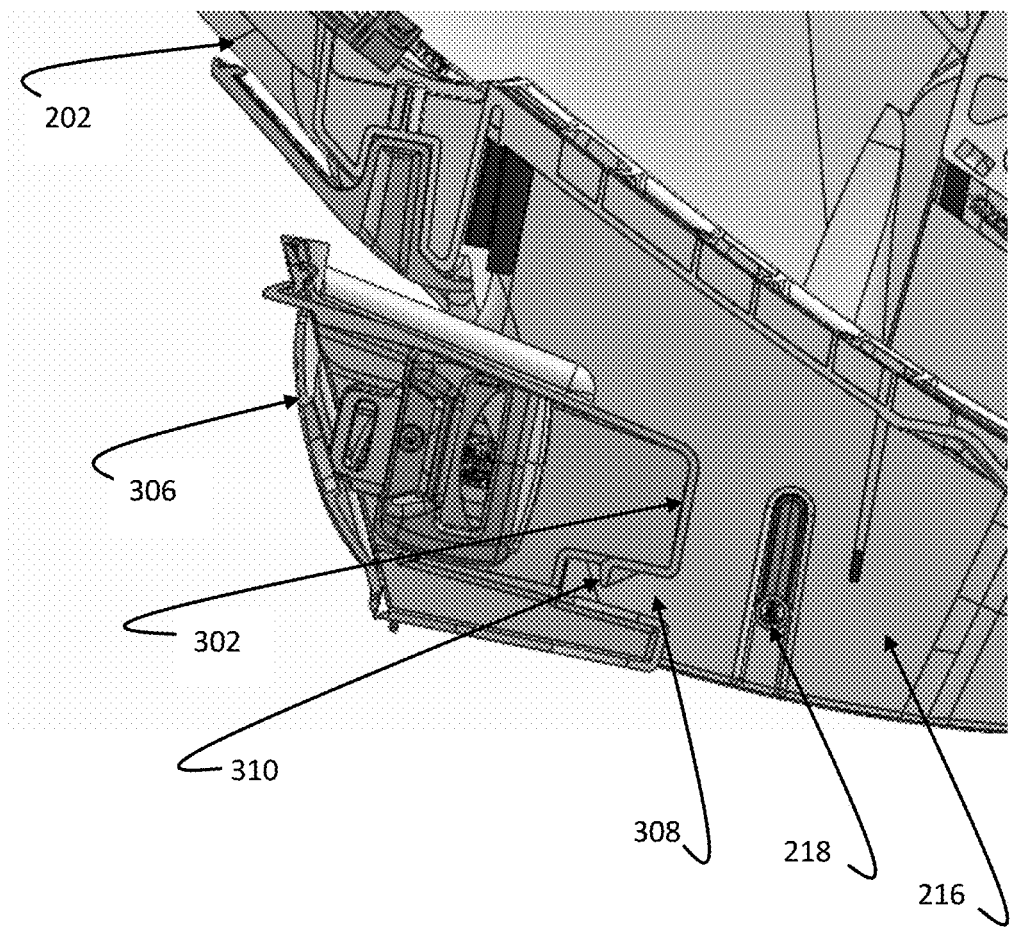
FIG. 8 is a cross-sectional view of the infant carrier, depicting the storage unit being installed in the cavity of the seat body.

As shown in FIG. 8, a lower surface of the seat shell 202 may define a cavity 216, and the storage unit 300 may be disposed within the cavity 216, such that the storage unit 300 does not extend beyond the contours of the seat body 300. With this configuration, the storage unit 300 does not impact the stability of the infant seat 100 when the seat body 200 is placed on the vehicle seat.

Figure 6:
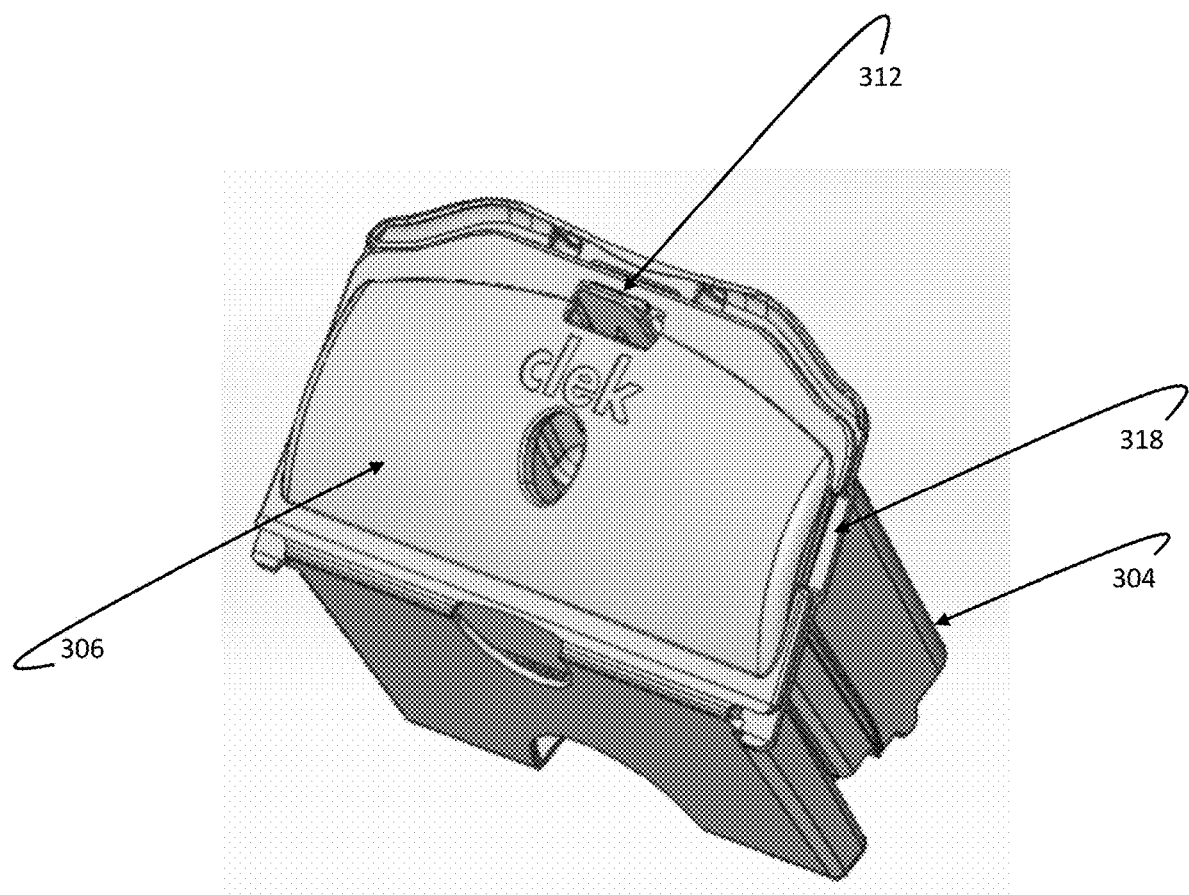
FIG. 6 is a top elevation of the storage unit, with the lid in the closed position.
Figure 7:
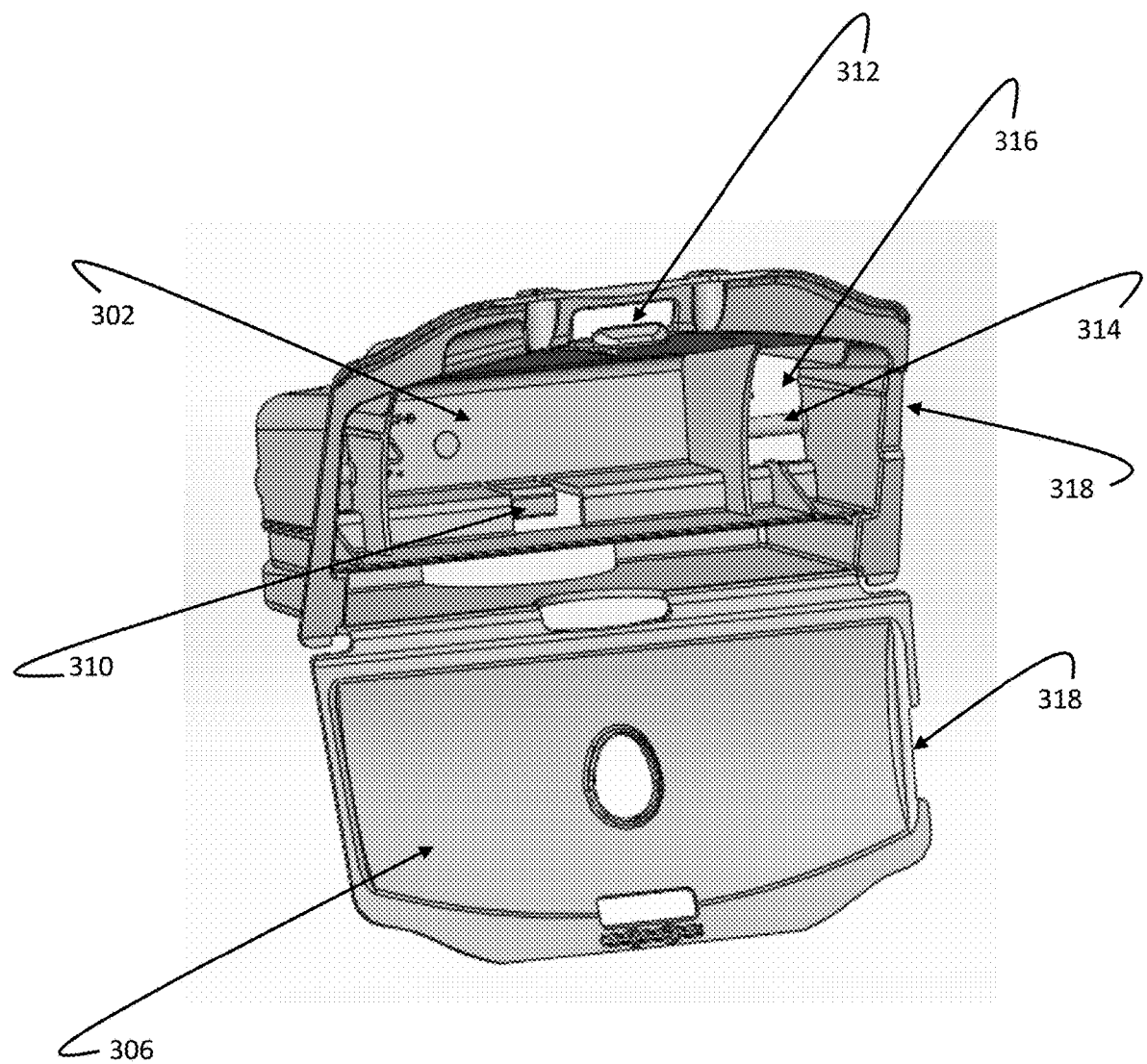
FIG. 7 is a top elevation of the storage unit, with the lid in the opened position.

As shown in FIGS. 6 and 7, the storage unit 300 includes a bottom 302, and a side wall 304 that extends from the bottom 302. The storage unit 300 may also include a lid 306 which, together the bottom 302 and the side wall 304, define a storage volume therebetween.

The infant carrier 100 may also include a non-rigid restraint assembly 400 that includes the flexible belt web 402. The storage unit 300 may be dimensioned such that the entire non-rigid restraint assembly 400 may be retained within the storage volume when the flexible belt web 402 is not being used to secure the infant carrier 100 to the vehicle seat. Therefore, the storage unit 300 allows the infant carrier 100 (and the infant) to be easily transported into and out of the vehicle without the non-rigid restraint assembly 400 becoming entangled with the seat belts of the vehicle.

As shown in FIG. 8, the bottom surface of the seat shell 202 may also include at least one mounting rod 218 that is secured to the seat shell 202 and extends through the cavity 216. The bottom 302 of the storage unit 300 may include a mounting channel 308 that is configured to capture one of the mounting rods 218 therein. The mounting channel 308 may include a resilient finger 310 that is configured to resist release of the mounting rod 218 from the mounting channel 308.

The storage unit 300 may be secured to the seat shell 202 by urging one of the mounting rods 218 into the mounting channel 308 until the mounting rod 218 passes the resilient finger 310 and is captured in the mounting channel 308. Typically, the mounting channel 308 is configured to capture a rearward most one of the mounting rods 218 therein. Immediately after the mounting rod 218 is captured in the mounting channel 308, the storage unit 300 is in an "exposed" position in which the storage unit 300 is remote from the cavity 216. However, the storage unit 300 is pivotally secured to the seat shell 202 via the mounting rod 218 and the mounting channel 308.

The storage unit 300 may then be rotated, about the mounting rod 218, from the exposed position, into a "recessed" position in which the storage unit 300 is disposed within the cavity 216, as shown in FIGS. 1 and 2. As discussed, in this position, the storage unit 300 does not extend beyond the contours of the seat body 300. The storage unit 300 may then be retained in the recessed position, if desired, by screws (not shown), or other suitable fasteners, deployed between the storage unit 300 and the seat shell 202.

Figure 3:
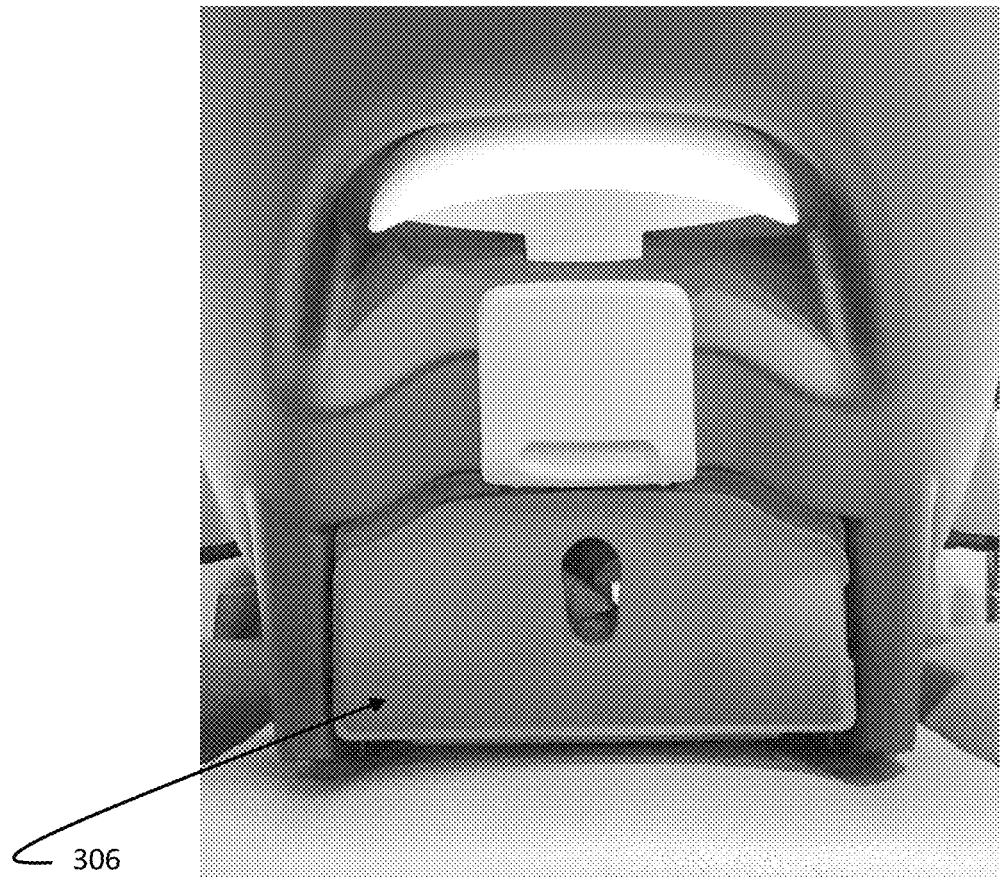
FIG. 3 is a top elevation of the storage unit, depicting the lid in the closed position.

The lid 306 may be rotatably secured to the side wall 304 of the storage unit 300 via a hinge mechanism. After the storage unit 300 is disposed in the recessed position, the lid 306 may be rotated, relative to the side wall 304, between a closed position in which the storage volume of the storage unit 300 is not externally accessible (see FIGS. 3 and 6) and an opened position in which the storage volume of the storage unit 300 is externally accessible (see FIGS. 4 and 7).

The storage unit 300 may also include a resilient locking tab 312 (see FIGS. 6 and 7) that selectively engages the lid 306 and maintains the lid 306 in the closed position. The locking tab 312 may be disengaged from the lid 306 by urging the locking tab 312 laterally, to thereby allow the lid 306 to be rotated into the opened position.

As shown in FIG. 7, the storage unit 300 may also include an anchor rod 314 that extends between the side wall 304 of the storage unit 300 and the bottom 302 of the storage unit 300. The bottom 302 may also include apertures 316 that expose a portion of the anchor rod 314.

As shown in FIG. 10, the non-rigid restraint assembly 400 includes the flexible belt web 402, a belt tether 404 and a pair of latches 406. The belt web 402 includes a pair of opposite web ends. The latches 406 are each disposed at a respective one of the web ends. However, as will be discussed, the latches 406 may be selectively movable along the length of the belt web 402 in order to facilitate adjustment of the tension of the belt web 402 when the belt web 402 is being used to secure the infant seat 100 to a vehicle.

The belt tether 404 includes a pair of opposite tether ends and is secured to the belt web 402 at one of the tether ends. The other tether end of the belt tether 404 may be secured to the storage unit 300, for example by a rivet or other suitable fastener.

The latches 406 are each configured to engage a respective LATCH system anchor of the vehicle. However, when the belt web 402 is stored within the storage unit 300 (see FIG. 4), the latches 406 may be secured in place within the storage unit 300 by extending the latches 406 through the apertures 316 and mounting the latches 406 to the anchor rods 314.

Figure 5:
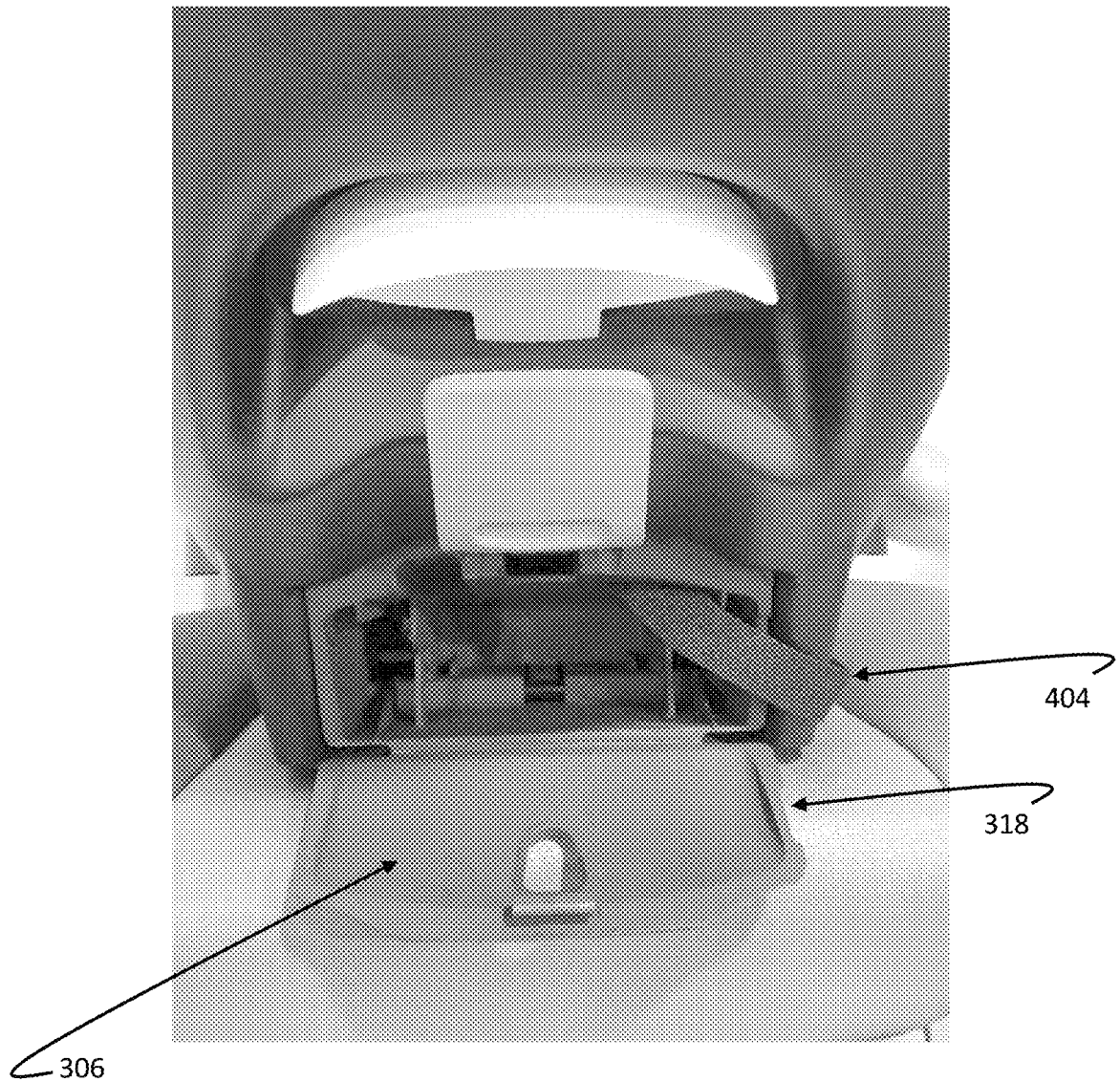
FIG. 5 is a top elevation of the storage unit with the non-rigid restraint assembly removed from the storage volume and depicting the belt tether extending from the storage volume.

As shown in FIGS. 5 and 7, the storage unit 300 may also include an access channel 318 that allows the belt tether 404 to extend outwards from the storage volume, through the access channel 318 when, for example, the lid 306 is disposed in the closed position. The access channel 318 may be incorporated into the side wall 304 and/or the lid 306 of the storage unit 300, and allows the belt web 402 to be removed from the storage unit 300, and the lid 306 to be rotated back into the closed position, without damaging the belt tether 404. Therefore, the belt web 402 may be secured to the LATCH system anchors of the vehicle, via the latches 406, without disconnecting the non-rigid restraint assembly 400 from the storage unit 300.

As discussed, the infant carrier 100 may be transported into a vehicle via the U-shaped transport handle 214, and positioned on the seat cushion of the vehicle seat, as shown in FIGS. 1 and 9. The transport handle 214 may then be rotated towards the upper body cushion 204 of the infant carrier 100. The infant carrier 100 may be positioned such that the seat cushion of the infant carrier 100 is facing towards the rear of the vehicle. In this position, the storage unit 300 can be readily accessed.

After the infant carrier 100 is positioned on the vehicle seat, the lid 306 of the storage unit 300 may be rotated from the closed position into the opened position, thereby exposing the storage volume of the storage unit 300 and the non-rigid restraint assembly 400 stored therein.

The latches 406 may then be uncoupled from the anchor rod 314, and the belt web 402 may be pulled from the storage volume, towards the seat back of the vehicle, until a portion of the belt tether 404 extends through the access channel 318 of the storage unit 300, as shown in FIG. 5. The lid 306 may then be rotated back into the closed position, thereby capturing the belt tether 404 in the access channel 314.

The belt web 402 may then be looped around the seat body 200, proximate the lower body cushion 206, though the belt guides 212, as shown in FIGS. 9 and 10. The latches 406 of the non-rigid restraint assembly 400 may then be secured to the LATCH system anchors of the vehicle. If desired, the tension of the belt web 402 around the lower body cushion 206 may be adjusted, for example, by moving the latches 406 along the length of the belt web 402.

The belt guides 212 retain the belt web 402 in close proximity to the seat body 200, and prevent the belt web 402 from sliding off the seat body 200, thereby securing the infant carrier 100 to the vehicle seat. The belt tether 404 may have a length that is sufficient to ensure that the belt web 402 does not apply tension to the storage unit 300 when the belt web 402 is secured to the LATCH system anchors and tightened around the seat body 200.

Figure 4:
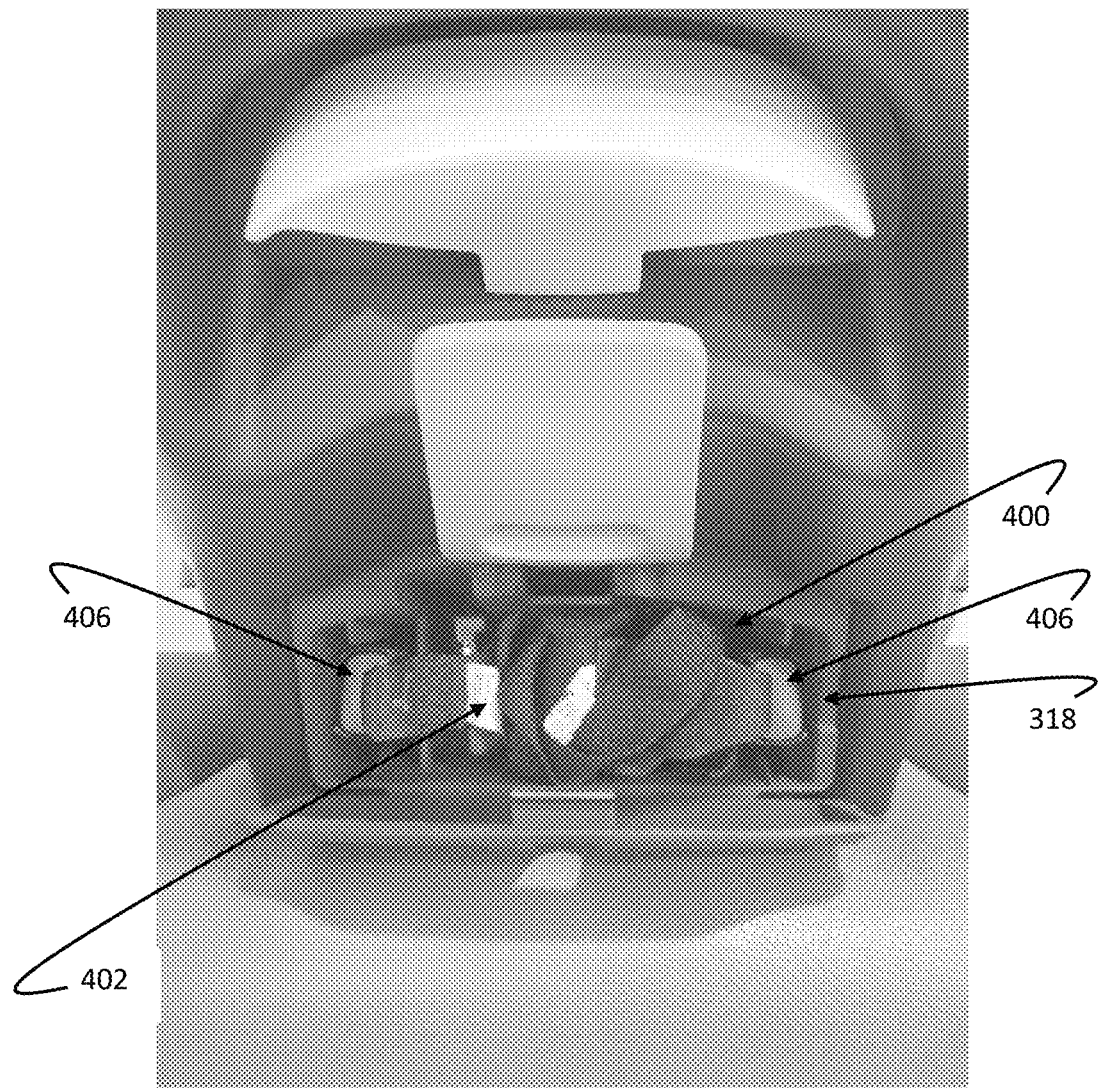
FIG. 4 is a top elevation of the storage unit with the lid in the opened position, and revealing the non-rigid restraint assembly occupying the storage volume.

The infant carrier 100 may be removed from the vehicle by releasing the latches 406 from the LATCH system anchors of the vehicle. The belt web 402 may then be removed from the belt guides 212, and the entire non-rigid restraint assembly 400 returned to the storage unit 300, as shown in FIG. 4. Therefore, the infant seat 100 may be easily removed from the vehicle without the non-rigid restraint assembly 400 becoming entangled with, for example, the seat belts of the vehicle.

The seat body 200 may be optionally used with a conventional base section that is secured to the vehicle. In this variation, the storage unit 300 may be detached from the seat body 200 by removing any fasteners that may have been used to retain the storage unit 300 in the recessed position, rotating the storage unit 300 about the mounting rod 218, from the recessed position into the exposed position, and pulling the storage unit 300 away from the seat shell 202 until the mounting rod 218 becomes disengaged from the mounting channel 308. The conventional base section includes mounting channels that are configured to capture the mounting rods 218. Therefore, the seat body 200 may be secured to the base section by engaging the mounting rods 218 with the corresponding mounting channels in the base section.

The invention claimed is:

1. An infant carrier comprising:
   seat body configured to support an infant;
   a storage unit integrated into the seat body; and
   a non-rigid restraint assembly secured to the storage unit,
   wherein the storage unit is configured to retain an entirety of the non-rigid restraint assembly therein, and
   wherein the seat body includes a seat shell, a lower surface of the seat shell defines a cavity opening outward through a bottom of the seat shell, and the storage unit comprises a compartment that is pivotable relative to the seat shell between a recessed position in which the compartment is disposed within the cavity and an exposed position in which the storage unit is remote from the cavity.

2. The infant carrier according to claim 1, wherein the storage unit includes a storage unit bottom, a storage unit side wall extending from the storage unit bottom, and a lid secured to the storage unit side wall, and wherein the storage unit side wall and the lid define a storage volume therebetween, and the lid is rotatable relative to the storage unit side wall between an opened position and a closed position when the storage unit is disposed in the recessed position.

3. The infant carrier according to claim 2, wherein the storage volume is externally accessible when the lid is disposed in the opened position, and the storage volume is not externally accessible when the lid is disposed in the closed position.

4. The infant carrier according to claim 3, wherein the non-rigid restraint assembly includes a flexible belt web, a belt tether and a pair of latches, the belt web includes a pair of opposite web ends, the latches are each disposed at a respective one of the web ends, and the belt tether includes a pair of opposite tether ends and is secured to the belt web at one of the tether ends and is secured to the storage unit at another of the tether ends.

5. The infant carrier according to claim 4, wherein the storage unit includes an access channel configured to allow the belt tether to extend from the storage volume through the access channel when the lid is disposed in the closed position.

6. The infant carrier according to claim 4, wherein the storage unit bottom includes an aperture, the storage unit includes an anchor rod extending between the storage unit side wall and the storage unit bottom, and at least one of the latches extends through the aperture and is secured to the anchor rod.

7. The infant carrier according to claim 4, wherein the seat shell includes a pair of opposing shell side walls and a belt guide secured to each of the shell side walls, the latches are each configured to engage a respective vehicle seat anchor, and the belt guides are configured to retain the belt web proximate the seat body when the latches are in engagement with the vehicle seat anchors.

8. The infant carrier according to claim 2, wherein the seat body includes a mounting rod secured to the seat shell and extending through the cavity, the storage unit bottom includes a mounting channel capturing the mounting rod therein, and the storage unit is pivotally secured to the seat shell via the mounting rod and the mounting channel.

9. The infant carrier according to claim 8, wherein the mounting channel includes a finger resisting release of the mounting rod from the mounting channel.

10. An infant carrier comprising:
    seat body configured to support an infant;
    a storage unit integrated into the seat body, and
    a non-rigid restraint assembly,
    wherein the seat body includes a seat shell, a lower surface of the seat shell defines a cavity opening outward through a bottom of the seat shell, the storage unit comprises a compartment that is pivotable relative to the seat shell between a recessed position in which the compartment is disposed within the cavity and an exposed position in which the storage unit is remote from the cavity, and the non-rigid restraint assembly is secured to the compartment.

11. The infant carrier according to claim 10, wherein the storage unit includes a storage unit bottom, a storage unit side wall extending from the storage unit bottom, and a lid secured to the storage unit side wall, and wherein the storage unit bottom, the storage unit side wall and the lid define a storage volume therebetween, and the lid is rotatable relative to the storage unit side wall between an opened position and a closed position when the storage unit is disposed in the recessed position.

12. The infant carrier according to claim 11, wherein the storage volume is externally accessible when the lid is disposed in the opened position, and the storage volume is not externally accessible when the lid is disposed in the closed position.

13. The infant carrier according to claim 12, wherein the storage unit is configured to retain an entirety of a non-rigid restraint assembly therein, the non-rigid restraint assembly includes a belt web and a belt tether secured to the belt web, and the storage unit includes an access channel configured to allow the belt tether to extend from the storage volume through the access channel when the lid is disposed in the closed position and the belt web is disposed externally to the storage volume.

14. The infant carrier according to claim 11, wherein the storage unit bottom includes an aperture, and the storage unit includes an anchor rod extending between the storage unit side wall and the storage unit bottom.

15. The infant carrier according to claim 11, wherein the seat body includes a mounting rod secured to the seat shell and extending through the cavity, the storage unit bottom includes a mounting channel capturing the mounting rod therein, and the storage unit is pivotally secured to the seat shell via the mounting rod and the mounting channel.

16. The infant carrier according to claim 15, wherein the mounting channel includes a finger resisting release of the mounting rod from the mounting channel.

17. The infant carrier according to claim 10, wherein the seat shell includes a pair of opposing side sections and a belt guide secured to each of the side sections.

18. The infant carrier according to claim 10, wherein the seat body includes a seat cushion provided on an upper surface of the seat shell.

\* \* \* \* \*